US012797772B2

(12) United States Patent
Kawashima et al.

(10) Patent No.: US 12,797,772 B2
(45) Date of Patent: Nov. 17, 2026

(54) METHOD FOR EXTRACTING ORGANIC HALOGEN COMPOUND

(71) Applicant: MIURA CO., LTD., Matsuyama (JP)

(72) Inventors: Ayato Kawashima, Matsuyama (JP); Kenji Inaba, Matsuyama (JP); Yuka Makita, Matsuyama (JP); Yuko Matsudaira, Matsuyama (JP)

(73) Assignee: MIURA CO., LTD., Matsuyama (JP)

( * ) Notice: Subject to any disclaimer, the term of this patent is extended or adjusted under 35 U.S.C. 154(b) by 556 days.

(21) Appl. No.: 18/277,486

(22) PCT Filed: Sep. 22, 2021

(86) PCT No.: PCT/JP2021/034788
§ 371 (c)(1),
(2) Date: Aug. 16, 2023

(87) PCT Pub. No.: WO2022/176252
PCT Pub. Date: Aug. 25, 2022

(65) Prior Publication Data

US 2024/0123371 A1 Apr. 18, 2024

(30) Foreign Application Priority Data

Feb. 19, 2021 (JP) ................................ 2021-025067

(51) Int. Cl.
*B01D 15/42* (2006.01)
*B01J 20/06* (2006.01)
(Continued)

(52) U.S. Cl.
CPC ............ *B01D 15/426* (2013.01); *B01J 20/06* (2013.01); *B01J 20/28016* (2013.01); *G01N 2030/062* (2013.01); *G01N 30/14* (2013.01)

(58) Field of Classification Search
None
See application file for complete search history.

(56) References Cited

U.S. PATENT DOCUMENTS 5,540,834 A * 7/1996 Carr ........................ B01J 20/282
210/656
2002/0160196 A1* 10/2002 Carr ..................... B01J 20/3078
428/407
2010/0140154 A1* 6/2010 Colon ................... C04B 35/632
210/198.2

FOREIGN PATENT DOCUMENTS

CN 106841404 A * 6/2017 ........... G01N 30/465
JP 6-335619 A 12/1994
(Continued)

OTHER PUBLICATIONS

ZirChrom Technology introduction—product brochure << https://www.zirchrom.com/Intro.asp >> (Year: 2026).*
(Continued)

*Primary Examiner* — Krishnan S Menon
(74) *Attorney, Agent, or Firm* — Birch, Stewart, Kolasch & Birch, LLP

(57) ABSTRACT

Provided is an extraction column (1) including a first column (10) having an adsorbent layer (100) and a second column (20) detachably coupled to the first column (10) and filled with a trapping layer (200) containing zirconium oxide in a powder grain form. After a solution containing an organic halogen compound and an impurity has been added to the adsorbent layer (100), an aliphatic hydrocarbon solvent is supplied to and passes through the adsorbent layer (100) and the trapping layer (200) in this order. At this point, the impurity in the solution is treated in the adsorbent layer (100), and the organic halogen compound in the solution is dissolved in the aliphatic hydrocarbon solvent and passes through the adsorbent layer (100). Then, the organic halogen compound is trapped in the trapping layer (200). After passage of the aliphatic hydrocarbon solvent, an extraction solvent is supplied to the second column (20) separated from the first column (10). After the extraction solvent has passed
(Continued)

through the trapping layer (200), the extraction solvent turns into an extract containing the organic halogen compound extracted from the trapping layer (200).

4 Claims, 6 Drawing Sheets

(51) Int. Cl.

| | |
|---|---|
| ***B01J 20/28*** | (2006.01) |
| ***G01N 30/06*** | (2006.01) |
| ***G01N 30/14*** | (2006.01) |

(56) References Cited

FOREIGN PATENT DOCUMENTS

| | | |
|---|---|---|
| JP | 2000-102734 A | 4/2000 |
| JP | 2015-21869 A | 2/2015 |

OTHER PUBLICATIONS

Grun et al "Comparison of an ordered mesoporous aluminosilicate, silica, alumina, titania and zirconia in normal-phase high-performance liquid chromatography," Journal of Chromatography A. 740 (1996) 1-9 (Year: 1996).*

International Search Report, issued in PCT/JP2021/034788, PCT/ISA/210, dated Nov. 30, 2021.

Sediment Monitoring Methods (II.6.4), Environmental Management Bureau, Ministry of the Environment, Aug. 2012, total 32 pages.

Written Opinion of the International Searching Authority, issued in PCT/JP2021/034788, PCT/ISA/237, dated Nov. 30, 2021.

* cited by examiner

METHOD FOR EXTRACTING ORGANIC HALOGEN COMPOUND

TECHNICAL FIELD

The present application claims a priority based on Japanese Application No. 2021-025067 filed in Japan on Feb. 19, 2021, the contents of which are incorporated herein by reference.

The present invention relates to a method for extracting an organic halogen compound, and specifically relates to a method for extracting an organic halogen compound from a solution containing the organic halogen compound.

BACKGROUND ART

For a bottom sediment, soil, incinerated ash caused from an incineration facility, food, a biological sample such as blood or breast milk, environmental water or industrial drainage water such as seawater, river water, lake water, or groundwater, atmospheric air, exhaust from an incineration facility, electric insulating oil discarded from electric equipment, or the like, evaluation of a contamination status due to an organic halogen compound about which toxicity to a biological body has been concerned has been demanded. According to the Act on Special Measures against Dioxins (Act No. 105 of 1999), for dioxins known as an environmental pollutant having strong toxicity to a biological body, environmental standards have been established, emission control standards for each specific facility have been established, and regular quantitative evaluation has been demanded. According to food control standards (COMMISSION REGULATION (EU) No 1259/2011) in European Union (EU), dioxins and predetermined polychlorinated biphenyls which do not fall into the category of dioxins have been specified as organic halogen compounds targeted for control for food such as meat including beef and pork, animal oil and fat, egg, and vegetable oil including olive oil, and control values have been set for these organic halogen compounds and quantitative evaluation has been also demanded for these organic halogen compounds. Further, according to Method 1668C, April 2010 established by the United States Environmental Protection Agency (EPA), quantitative evaluation of polychlorinated biphenyls in water, soil, a bottom sediment, a living organism, or a body tissue has been demanded, and an evaluation method therefor has been specified.

Normally, in evaluation of the contamination status due to the organic halogen compound, the organic halogen compound is extracted, from a sample targeted for evaluation, using a solvent such as an aliphatic hydrocarbon solvent such as hexane or an aromatic hydrocarbon solvent such as toluene, and a solution containing the organic halogen compound obtained by such extraction is analyzed by a method using a high-sensitive analyzer such as a gas chromatograph/mass spectrometer (GC/MS) or a gas chromatograph/electron capture detector (GC/ECD).

When the organic halogen compound is extracted from the evaluation target sample for analysis, a solvent capable of efficiently extracting the organic halogen compound from the evaluation target sample is preferably used. However, an extract obtained using such a solvent is difficult to be directly applied to analysis equipment. In this case, the solvent of the extract is preferably substituted for other solvents easily applicable to the analysis equipment. However, for such substitution, operation needs to be simple, and a failure to recover the organic halogen compound, which is easily caused in the course of treatment, needs to be reduced.

Normally, when the organic halogen compound is extracted, for analysis, from the evaluation target sample, various organic compounds and the like are simultaneously extracted as impurities together with the organic halogen compound. For this reason, there are probabilities that the analysis equipment is contaminated with the impurities and the impurities influence an analysis result for the organic halogen compound if the extract is used as-is as the analysis sample. Thus, the organic halogen compound-containing extract from the evaluation target sample normally requires pretreatment for removing the impurities. However, in this pretreatment, the impurities need to be removed while a failure to recover the organic halogen compound is reduced. For example, polychlorinated biphenyls (hereinafter sometimes referred to as PCBs) are a collective term of biphenyls that hydrogen atoms are substituted for chlorine atoms. Based on a substituted chlorine number, there are ten types of homologues from monochlorobiphenyl to decachlorobiphenyl. Moreover, based on the substituted chlorine number and a substituted chlorine position, there are 209 types of homologues. For this reason, in order to analyze, with a high accuracy, the PCBs extracted from the evaluation target sample, pretreatment in which the rate of recovery of each homologue of the PCBs is less likely to be degraded, i.e., high-accuracy pretreatment in which the impurities can be removed such that the rate of recovery remains within a public acceptable range, is demanded.

As one type of the high-accuracy pretreatment, Non-Patent Literature 1 describes a pretreatment method for a hexane solution with PCBs extracted from a bottom sediment. In this pretreatment method, sulfuric acid treatment is repeated for the hexane solution which is a sample. After such treatment, the hexane solution is rinsed with a saturated sodium chloride solution and is concentrated. Then, the concentrated hexane solution is further treated with a silica gel column including sodium sulfate, and in this manner, the PCBs are extracted using hexane from the silica gel column. This pretreatment method can effectively remove the impurities without degradation of the rate of recovery of each homologue of the PCBs, but requires a long time until completion due to a manual work in large part of a process and has a limitation on a treatable amount within a certain period of time.

PRIOR ART LITERATURE

Non-Patent Literature

Non-Patent Literature 1: Sediment Monitoring Methods (II.6.4), Environmental Management Bureau, Ministry of the Environment, August 2012

DISCLOSURE OF THE INVENTION

Problems to be Solved by the Invention

The present invention is intended to extract, with less failure to recover an organic halogen compound, the organic halogen compound from a solution containing the organic halogen compound by simple operation.

Solution to the Problems

The present invention relates to a method for extracting an organic halogen compound from a solution containing the organic halogen compound. The extraction method includes: a step of adding the solution to a trapping layer capable of trapping the organic halogen compound; a step of supplying an aliphatic hydrocarbon solvent to the trapping layer, to which the solution has been added, and causing the aliphatic hydrocarbon solvent to pass through the trapping layer; a step of supplying an extraction solvent for extracting the organic halogen compound to the trapping layer, through which the aliphatic hydrocarbon solvent has passed, and causing the extraction solvent to pass through the trapping layer; and a step of obtaining the extraction solvent having passed through the trapping layer. The trapping layer used herein contains zirconium oxide in a powder grain form.

In this extraction method, when the aliphatic hydrocarbon solvent is supplied to the trapping layer to which the solution has been added, the aliphatic hydrocarbon solvent passes through the trapping layer while dissolving the organic halogen compound in the solution. At this point, the organic halogen compound dissolved in the aliphatic hydrocarbon solvent is trapped in the trapping layer. Then, when the extraction solvent is supplied to the trapping layer, the extraction solvent passes through the trapping layer while dissolving the organic halogen compound trapped in the trapping layer. Thus, when the extraction solvent having passed through the trapping layer is obtained, the organic halogen compound-containing extract, i.e., the extraction solvent solution, is obtained.

The present invention according to another aspect relates to a method for extracting an organic halogen compound from a solution containing the organic halogen compound and an impurity. The extraction method includes: a step of adding the solution to an adsorbent layer capable of treating the impurity; a step of supplying an aliphatic hydrocarbon solvent to the adsorbent layer, to which the solution has been added, and causing the aliphatic hydrocarbon solvent to pass through the adsorbent layer; a step of supplying the aliphatic hydrocarbon solvent having passed through the adsorbent layer to a trapping layer capable of trapping the organic halogen compound and causing the aliphatic hydrocarbon solvent to pass through the trapping layer; a step of supplying an extraction solvent for extracting the organic halogen compound to the trapping layer, through which the aliphatic hydrocarbon solvent has passed, and causing the extraction solvent to pass through the trapping layer; and a step of obtaining the extraction solvent having passed through the trapping layer. The trapping layer used herein contains zirconium oxide in a powder grain form.

In this extraction method, when the aliphatic hydrocarbon solvent is supplied to the adsorbent layer to which the solution has been added, the organic halogen compound and the impurity in the solution are dissolved in the aliphatic hydrocarbon solvent and pass through the adsorbent layer. At this point, the impurity in the solution is treated. Subsequently, when the aliphatic hydrocarbon solvent having passed through the adsorbent layer is supplied to the trapping layer and passes through the trapping layer, the organic halogen compound in the aliphatic hydrocarbon solvent from the adsorbent layer is trapped in the trapping layer, and the aliphatic hydrocarbon solvent passes through the trapping layer with the organic halogen compound removed therefrom. When the extraction solvent is supplied to the trapping layer, the extraction solvent passes through the trapping layer while extracting the organic halogen compound trapped in the trapping layer. Thus, when the extraction solvent from the trapping layer is obtained, the extract containing the organic halogen compound contained in the solution is obtained.

The solution to which the extraction method is applicable contains, for example, an organic halogen compound extracted using a solvent from a material layer on a bottom in the hydrosphere or a land surface, food, a biological sample, environmental water, drainage water, electric insulating oil, incinerated ash, or a collector having collected a substance contained in gas.

The present invention according to still another aspect relates to a column for trapping an organic halogen compound contained in a solution. The column is filled with a trapping layer containing zirconium oxide in a powder grain form.

The present invention according to still another aspect relates to a column for extracting an organic halogen compound from a solution containing the organic halogen compound and an impurity. The column includes a first column filled with an adsorbent layer capable of treating the impurity, and a second column detachably coupled to the first column and filled with a trapping layer capable of trapping the organic halogen compound. The trapping layer contains zirconium oxide in a powder grain form.

The present invention according to still another aspect relates to a trapping material for an organic halogen compound. The trapping material contains zirconium oxide in a powder grain form.

Effects of the Invention

The method for extracting the organic halogen compound according to the present invention uses the trapping layer containing zirconium oxide in a powder grain form. Therefore, the organic halogen compound can be extracted from the solution containing the organic halogen compound, specifically the solution containing the organic halogen compound and the impurity, by simple operation while a failure to recover the organic halogen compound is reduced.

The column for trapping the organic halogen compound and the column for extracting the organic halogen compound according to the present invention have the trapping layer containing zirconium oxide in a powder grain form. Therefore, the aforementioned columns can be used in the method for extracting the organic halogen compound according to the present invention.

The trapping material for the organic halogen compound according to the present invention contains zirconium oxide in a powder grain form. Therefore, the aforementioned trapping material can trap the organic halogen compound contained in the solution while a failure to recover the organic halogen compound is reduced.

DESCRIPTION OF PREFERRED EMBODIMENTS

A method for extracting an organic halogen compound according to the present invention relates to a method for extracting an organic halogen compound from a solution containing the organic halogen compound.

The organic halogen compound targeted for extraction includes, for example, dioxins (polychlorinated dibenzo-p-dioxins (PCDDs) and polychlorinated dibenzofurans (PCDFs)), polyhalogenated biphenyls such as polychlorinated biphenyls (PCBs) and polybrominated biphenyls, polybrominated diphenyl ethers (PBDEs), chlordanes used as pesticides, and various organic halogen compounds targeted for the POPs regulation (Stockholm Convention). A solution containing the organic halogen compound and targeted for the extraction method of the present invention, i.e., an organic halogen compound-containing solution, is normally a solution containing the organic halogen compound extracted using a solvent from a target for which evaluation of, e.g., a contamination status due to the organic halogen compound is required, the target including, e.g., material layers on a bottom in the hydrosphere and a land surface, such as a bottom sediment and soil; food such as an agricultural crop, meat, and seafood; body fluid such as breast milk and blood; a biological sample such as an organ and a tissue; environmental water such as river water, lake water, and groundwater; drainage water such as industrial wastewater and domestic wastewater; electric insulating oil; incinerated ash caused from an incineration facility; and a collector such as a filter having collected a substance contained in gas such as environmental air or exhaust from an incineration facility. The extraction solvent for obtaining such a solution is not specifically limited as long as the organic halogen compound can be dissolved in the solvent, and is normally an organic solvent. The organic solvent to be used includes, for example, an aliphatic hydrocarbon solvent, specifically: a non-polar aliphatic hydrocarbon solvent with a carbon number of 5 to 10, such as n-hexane, isooctane, nonane, or decane; an aromatic hydrocarbon solvent such as toluene or xylene; or a polar organic solvent such as acetone, diethyl ether, or dichloromethane.

The organic halogen compound-containing solution normally contains, together with the organic halogen compound, various impurities derived from the above-described evaluation target for which evaluation of, e.g., the contamination status due to the organic halogen compound is required, mainly various organic substances other than the organic halogen compound. The impurities include, for example, aromatic compounds such as polycyclic aromatic hydrocarbons and aliphatic hydrocarbons such as paraffins.

First Embodiment

Figure 1:
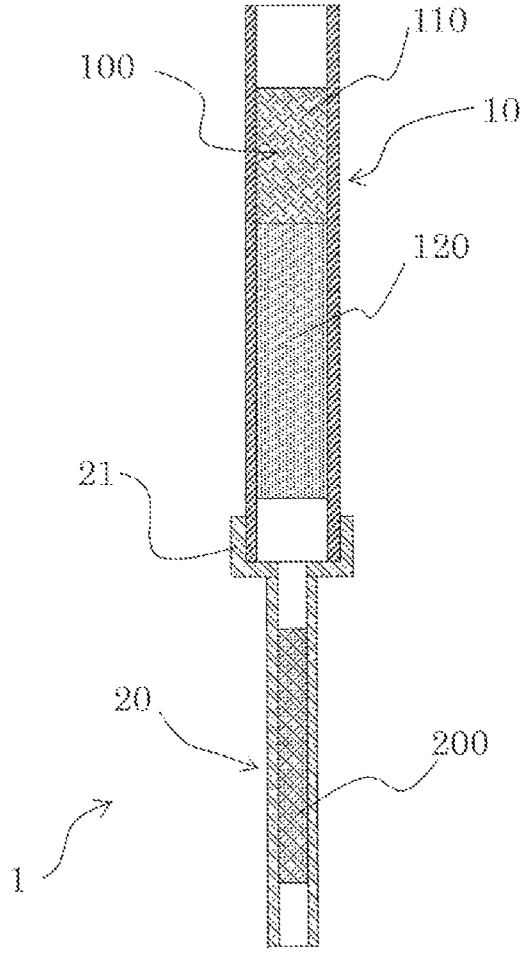
FIG. 1 is a schematic view of one embodiment of an extraction column available for a method for extracting an organic halogen compound according to the present invention.

One example (first embodiment) of an extraction column used for performing the method for extracting the organic halogen compound according to the present invention will be described with reference to FIG. 1. In the figure, an extraction column 1 mainly includes a first column 10 and a second column 20 (one form of a column for trapping the organic halogen compound according to the present invention) coupled to the first column 10 to form a series of flow path system, and is installed in a standing state.

The first column 10 is a cylindrical member opening at both ends, and is made of a material having at least solvent resistance, chemical resistance, and thermal resistance, such as glass, resin, or metal having these properties. The first column 10 has, at an outer peripheral surface of a lower end portion as viewed in the figure, a thread portion (not shown) to be coupled to the second column 20, and is filled with an adsorbent layer 100. The adsorbent layer 100 is for treating the impurity contained in the organic halogen compound-containing solution, and for example, is for decomposing the impurity or trapping the impurity or a decomposition product thereof. The adsorbent layer 100 is configured such that a holding layer 110 and a sulfuric silica gel layer 120 are stacked in this order from above in the first column 10.

The holding layer 110 is a layer having liquid permeability, and the organic halogen compound-containing solution can penetrate the holding layer 110. The holding layer 110 is formed by filling with a material inactive against the organic halogen compound. The material forming the holding layer 110 includes, for example, silica gel in a grain form, active silica gel the degree of activity of which has been enhanced by heating of silica gel in a grain form, silicon dioxide in a grain form or an irregular shape, a glass fiber in a cotton form, quartz glass in a cotton form, florisil (magnesium silicate) in a grain form, activated white earth in a grain form, diatomaceous earth such as cerite, and one obtained in such a manner that a resin material such as polyethylene resin, polypropylene resin, or fluorine-based resin including polytetrafluoroethylene resin, polyvinylidene fluoride resin, or perfluoroalkoxy alkane resin is formed into, e.g., grains. Of these materials, two or more types may be used in combination. In this case, these materials may be mixed together, or may be arranged as multiple layers in an up-down direction. As the above-described material, silica gel, specifically silica gel in a grain form with a particle size of about 40 to 210 μm, is preferably used because this material is available at low cost and the first column 10 is easily filled with this material.

The filling density of the above-described material in the holding layer 110 is normally preferably set to 0.1 to 2.5 g/cm$^3$ and more preferably 0.2 to 1 g/cm$^3$. In a case where the filling density is less than 0.1 g/cm$^3$, there is a probability that when the organic halogen compound-containing solution is added to the adsorbent layer 100, the added organic halogen compound-containing solution is less likely to be held in the holding layer 110, penetrates the holding layer 110 within a short time, and transfers to the sulfuric silica gel layer 120. Conversely, in a case where the filling density exceeds 2.5 g/cm$^3$, there is a probability that when an aliphatic hydrocarbon solvent is supplied to the adsorbent layer 100 as described later, the aliphatic hydrocarbon solvent is less likely to pass through the holding layer 110.

The sulfuric silica gel layer 120 is formed by filling with sulfuric silica gel. The sulfuric silica gel used herein is prepared in such a manner that concentrated sulfuric acid is uniformly added to a surface of silica gel (normally, active silica gel the degree of activity of which has been enhanced by heating) in a grain form with a particle size of about 40 to 210 μm. The amount of concentrated sulfuric acid added to silica gel is normally preferably set to 10 to 60% of the mass of the silica gel.

The filling density of the sulfuric silica gel in the sulfuric silica gel layer 120 is normally preferably set to 0.2 to 2.0 g/cm$^3$ and more preferably 0.5 to 1.0 g/cm$^3$. In a case where the filling density is less than 0.2 g/cm$^3$, there is a probability that the impurity other than the organic halogen compound in the organic halogen compound-containing solution is less likely to be trapped in the sulfuric silica gel layer 120 and it is difficult to separate the organic halogen compound and the impurity in the organic halogen compound-containing solution. Conversely, in a case where the filling density exceeds 2.0 g/cm$^3$, there is a probability that when the aliphatic hydrocarbon solvent is supplied to the adsorbent layer 100 as described later, the aliphatic hydrocarbon solvent is less likely to pass through the sulfuric silica gel layer 120.

Regarding the filling amounts of the holding layer 110 and the sulfuric silica gel layer 120 in the adsorbent layer 100, depending on the amount (sample amount) of organic halogen compound-containing solution to be applied to the extraction column 1, the filling amount of the holding layer 110 is normally preferably set to 0.2 to 3 mL and more preferably 0.5 to 1.5 mL in a case where the sample amount is, for example, 2 mL or less. In a case where the filling amount is less than 0.2 mL, there is a probability that when the organic halogen compound-containing solution is added to the adsorbent layer 100, the added organic halogen compound-containing solution is less likely to be held in the holding layer 110, penetrates the holding layer 110 within a short time, and transfers to the sulfuric silica gel layer 120. Conversely, in a case where the filling amount exceeds 3 mL, there is a probability that when the aliphatic hydrocarbon solvent is supplied to the adsorbent layer 100, the aliphatic hydrocarbon solvent is less likely to pass through the holding layer 110. Also, in a case where the sample amount is 2 mL or less, the filling amount of the sulfuric silica gel forming the sulfuric silica gel layer 120 is normally preferably set to 1 to 10 mL and more preferably 3 to 6 mL. In a case where the filling amount is less than 1 mL, there is a probability that the impurity other than the organic halogen compound in the organic halogen compound-containing solution is less likely to be trapped in the sulfuric silica gel layer 120 and it is difficult to separate the impurity and the organic halogen compound in the organic halogen compound-containing solution. Conversely, in a case where the filling amount exceeds 10 mL, there is a probability that when the aliphatic hydrocarbon solvent is supplied to the adsorbent layer 100, the aliphatic hydrocarbon solvent is less likely to pass through the sulfuric silica gel layer 120.

The second column 20 is a cylindrical member opening at both ends, and is made of a material similar to that of the first column 10. On the upper end side of the second column 20 as viewed in the figure, an attachment portion 21 into which the lower end portion of the first column 10 as viewed in the figure is insertable is formed. A thread portion (not shown) is formed, at an inner peripheral surface of the attachment portion 21, corresponding to the thread portion of the lower end portion of the first column 10.

The second column 20 is filled with a trapping layer 200. The trapping layer 200 contains a trapping material for the organic halogen compound, and the trapping material contains zirconium oxide in a powder grain form.

Zirconium oxide means zirconia, i.e., zirconium dioxide ($ZrO_2$), and has a capacity of adsorbing the organic halogen compound. Zirconium oxide used herein may be one the activity of which in adsorption of the organic halogen compound has been enhanced by firing under inert gas of, e.g., nitrogen or an air flow or stabilized zirconia or partially stabilized zirconia the stability of which in response to a temperature change has been enhanced by addition of calcium oxide, magnesium oxide, or rare-earth oxide such as yttrium oxide. The particle size of zirconium oxide is normally preferably 5 to 500 μm and more preferably 10 to 300 μm.

The trapping material may contain, together with zirconium oxide in a powder grain form, other materials capable of trapping the organic halogen compound, such as a carbon-based adsorbent including activated carbon and graphite or aluminum oxide, and may include an adsorbent such as silica gel, mesoporous silica gel, magnesium silicate, or zeolite. Of these other materials, two or more types may be used in combination.

The filling density of the trapping material in the trapping layer 200 is normally preferably set to 0.1 to 2.5 g/cm$^3$ and more preferably 0.5 to 1.5 g/cm$^3$. In a case where the filling density is less than 0.1 g/cm$^3$, there is a probability that it is difficult to recover the organic halogen compound contained in the organic halogen compound-containing solution while a failure to recover the organic halogen compound is reduced. Conversely, in a case where the filling density exceeds 2.5 g/cm$^3$, there is a probability that when the organic halogen compound is extracted using a later-described extraction solvent from the trapping layer 200, recovery of the organic halogen compound is insufficient or a pressure loss is great.

Depending on the amount (sample amount) of organic halogen compound-containing solution to be applied to the extraction column 1, the filling amount of the trapping material in the trapping layer 200 is normally preferably set to 0.2 to 3.0 mL and more preferably 0.3 to 1.5 mL in a case where the sample amount is, for example, 2 mL or less. In a case where the filling amount is less than 0.2 mL, there is a probability that part of the organic halogen compound contained in the organic halogen compound-containing solution is not trapped in the trapping layer 200 and the rate of recovery of the organic halogen compound is degraded. Conversely, in a case where the filling amount exceeds 3.0 mL, the amount of extraction solvent required for extracting the organic halogen compound trapped in the trapping layer 200 is great and uneconomical.

The first column 10 is detachably coupled to the second column 20 in a liquid-tight manner in such a manner that the thread portion provided at the outer periphery of the lower end of the first column 10 is attached to the thread portion provided at the inner peripheral surface of the attachment portion 21 of the second column 20.

The size of the extraction column 1 can be set as necessary according to the amount of organic halogen compound-containing solution to be treated. For example, in a case where the amount of organic halogen compound-containing solution is about 1 to 20 mL, the first column 10 is preferably set such that the inner diameter thereof is 10 to 20 mm and the length of a portion, which can be filled with the adsorbent layer 100, of the first column 10 is about 30 to 110 mm. Also, the second column 20 is preferably set such that the inner diameter thereof is 2.0 to 10 mm and the length of a portion, which can be filled with the trapping layer 200, of the second column 20 is about 10 to 50 mm.

Next, the method for extracting the organic halogen compound from the organic halogen compound-containing solution by means of the extraction column 1 will be described. In this extraction method, the extraction column 1 is installed in the standing state as shown in FIG. 1, and from the upper end opening, the organic halogen compound-containing solution is added onto the adsorbent layer 100 in the first column 10. The added organic halogen compound-containing solution gradually penetrates the holding layer 110, and is held in the holding layer 110.

In this step, in addition to addition of the organic halogen compound-containing solution to the adsorbent layer 100, the sample may be diluted in such a manner that a hydrocarbon solvent which can dissolve the organic halogen compound and can be mixed with the later-described aliphatic hydrocarbon solvent is added to the adsorbent layer 100. The hydrocarbon solvent may be continuously added immediately after the organic halogen compound-containing solution has been added to the adsorbent layer 100, or may be added to the organic halogen compound-containing solution in advance.

The aliphatic hydrocarbon solvent is supplied into the first column 10 through the upper end opening thereof. The aliphatic hydrocarbon solvent supplied into the first column 10 penetrates the adsorbent layer 100 while accumulated in an upper portion of the first column 10, and passes through the holding layer 110 and the sulfuric silica gel layer 120 in this order while dissolving the organic halogen compound-containing solution held in the holding layer 110. The aliphatic hydrocarbon solvent having passed through the adsorbent layer 100 as described above flows into the second column 20 through the lower end opening of the first column 10. In this process, part of the impurity other than the organic halogen compound in the aliphatic hydrocarbon solvent having dissolved the organic halogen compound-containing solution is trapped in the sulfuric silica gel layer 120 while passing through the sulfuric silica gel layer 120.

The aliphatic hydrocarbon solvent having flowed into the second column 20 passes through the trapping layer 200, and is discharged through the lower end opening. At this point, the organic halogen compound dissolved in the aliphatic hydrocarbon solvent from the first column 10 is selectively trapped in the trapping layer 200. Since the organic halogen compound is easily trapped in the trapping layer 200, the organic halogen compound is trapped mainly near an upper portion of the trapping layer 200. The impurity which is not trapped in the adsorbent layer 100, but flows into the second column 20 together with the organic halogen compound passes through the trapping layer 200 together with the aliphatic hydrocarbon solvent, and is discharged from the second column 20.

The aliphatic hydrocarbon solvent supplied to the first column 10 in the above-described step is an aliphatic saturated hydrocarbon solvent which can dissolve the organic halogen compound in the organic halogen compound-containing solution and normally has a carbon number of 5 to 8. For example, the aliphatic hydrocarbon solvent to be used includes n-pentane, n-hexane, n-heptane, n-octane, iso-octane, and cyclohexane. Specifically, n-hexane is preferable. The total amount of aliphatic hydrocarbon solvent to be supplied to the first column 10 is normally preferably set to 10 to 120 mL in a case where the size of the extraction column 1 is a known size. Moreover, the supply speed of the aliphatic hydrocarbon solvent is normally preferably set to 0.2 to 5.0 mL/min.

In the above-described step, the temperature of the adsorbent layer 100 is set to less than 35° C., preferably 30° C. or less, and more preferably 28° C. or less. Thus, in a case where the above-described step is performed under high-temperature environment and the temperature of the adsorbent layer 100 is 35° C. or more, the temperature of the adsorbent layer 100 is controlled to less than 35° C. by means of a coolant or a cooling device. When the temperature of the adsorbent layer 100 is 35° C. or more, there is a probability that part of the organic halogen compound, specifically an organic halogen compound (e.g., low chlorine PCBs) with a small chlorine number, is easily decomposed or adsorbed in the sulfuric silica gel layer 120 and the rate of extraction (rate of recovery) of part of the organic halogen compound is degraded. The lower limit of the temperature of the adsorbent layer 100 is not specifically limited as long as the temperature is within such a temperature range that the aliphatic hydrocarbon solvent can smoothly flow, but is normally preferably set to about 10° C. or more.

Next, the first column 10 and the second column 20 are separated from each other, and the second column 20 is vertically inverted. Then, while the entirety of the trapping layer 200 of the second column 20 is heated to about 35 to 90° C., inert gas such as nitrogen gas or air is supplied into the second column 20 through the opening having moved to the upper end side. Accordingly, the solvent, such as the aliphatic hydrocarbon solvent, remaining in the second column 20 is discharged together with, e.g., the inert gas through the opening of the second column 20 having moved to the lower end side. As a result, the solvent such as the aliphatic hydrocarbon solvent is removed from the trapping layer 200, and the trapping layer 200 is dried.

Next, the extraction solvent capable of dissolving the organic halogen compound is supplied through the upper end opening of the second column 20 standing in the vertically-inverted state. The supplied extraction solvent gradually penetrates the trapping layer 200 by the weight of the extraction solvent itself. The extraction solvent having penetrated the trapping layer 200 passes through the trapping layer 200, and flows out of the opening of the second column 20 having moved to the lower end side. At this point, the extraction solvent dissolves the organic halogen compound trapped in the trapping layer 200, and flows out of the opening together with the organic halogen compound. Thus, when the extraction solvent having flowed out of the opening is obtained, an extraction solvent solution containing the organic halogen compound, i.e., an intended organic halogen compound-containing extract, is obtained.

The organic halogen compound is in a state of being trapped mainly near a lower portion of the trapping layer 200 of the vertically-inverted second column 20. Therefore, the substantially total amount of organic halogen compound trapped in the trapping layer 200 is dissolved mainly in a portion of the extraction solvent initially flow out of the second column 20. Thus, only by mainly obtaining the portion of the extraction solvent having initially flowing out of the second column 20, the intended organic halogen compound-containing extract can be obtained. Thus, an extract amount can be a small amount easily utilized in later-described analysis operation. Moreover, the organic halogen compound-containing extract obtained herein is obtained in such a manner that the extraction solvent is supplied to the trapping layer 200 after the aliphatic hydrocarbon solvent has been removed from the trapping layer 200. Therefore, the organic halogen compound-containing extract can have a high purity with less aliphatic hydrocarbon solvent and impurity dissolved therein.

According to the extraction method of the present embodiment, the above-described extract can be normally obtained within a short time of about 0.5 to 1 hours from the start of the process.

When the organic halogen compound is extracted from the trapping layer 200, the extraction solvent is preferably supplied while the entirety of the trapping layer 200 is heated. The heating temperature of the trapping layer 200 is normally preferably set to at least 35° C. and more preferably 60° C. or more. The upper limit of the heating temperature is not specifically limited, but is normally about 90°

C. When the trapping layer 200 is heated in extraction, the total amount of organic halogen compound trapped in the trapping layer 200 is easily extracted using a smaller amount of extraction solvent. Also, the amount of organic halogen compound-containing extract can be controlled to a smaller amount so that the organic halogen compound-containing extract can be easily utilized in the later-described analysis operation.

The extraction solvent for extracting the organic halogen compound from the trapping layer 200 can be selected according to a method for analyzing the organic halogen compound. In a case where a gas chromatography method is employed as the analysis method, a hydrophobic solvent capable of dissolving the organic halogen compound is used as the extraction solvent. The hydrophobic solvent includes, for example, toluene, a solvent mixture of toluene and an aliphatic hydrocarbon solvent (e.g., n-pentane, n-hexane, n-heptane, n-octane, iso-octane, or cyclohexane), and a solvent mixture of an organic chlorine-based solvent (e.g., dichloromethane, trichloromethane, or tetrachloromethane) and an aliphatic hydrocarbon solvent (e.g., n-pentane, n-hexane, n-heptane, n-octane, iso-octane, or cyclohexane). Of these solvents, toluene is preferable because the organic halogen compound can be extracted from the trapping layer 200 with use of a small amount of solvent.

In a case where the hydrophobic solvent is used as the extraction solvent, the extract can be used, as a sample for analysis by the gas chromatography method, either as-is or by means of condensation as necessary. The gas chromatography method can be performed using a gas chromatograph including various detectors. However, normally, a gas chromatograph/mass spectrometry method (GC/MS method also including a GC/MS/MS method) or a gas chromatograph/electron capture detection method (GC/ECD method) with a favorable sensitivity to the organic halogen compound is preferable. Specifically, according to the GC/MS method, the quantity of organic halogen compound contained in the extract can be determined in units of isomers or homologues, and more findings can be obtained from an analysis result.

In a case where a bioassay method is employed as the analysis method, a hydrophilic solvent capable of dissolving the organic halogen compound is used as the extraction solvent. The hydrophilic solvent includes, for example, dimethylsulfoxide (DMSO) and methanol.

In a case where the hydrophilic solvent is used as the extraction solvent, the extract can be used as-is as a sample for analysis by a bioassay method such as an immunoassay method or an ELISA method.

The above-described extraction method uses the trapping material containing zirconium oxide in a powder grain form with an excellent capacity of selectively trapping the organic halogen compound in the trapping layer 200. Therefore, the organic halogen compound can be extracted from the organic halogen compound-containing solution by simple operation while a failure to recover the organic halogen compound is reduced. For example, in a case where the organic halogen compound-containing solution contains PCBs as the organic halogen compound, various homologues of the PCBs with a broad chlorine number range of 1 to 10 can be extracted with a high recovery rate. In a case where the organic halogen compound-containing solution contains dioxins (generally, a collective term of polychlorinated dibenzo-p-dioxins (PCDDs), polychlorinated dibenzofurans (PCDFs), and dioxin-like polychlorinated biphenyls (DL-PCBs); of 209 types of polychlorinated biphenyls (PCBs), the DL-PCBs are PCBs having toxicity similar to those of the PCDDs and the PCDFs and include non-ortho PCBs and mono-ortho PCBs) and polychlorinated biphenyls (non-DL-PCBs) not classified as dioxins, the PCDDs, the PCDFs, and various homologues of polychlorinated biphenyls with a broad chlorine number range of 1 to 10 can be collectively extracted with a high recovery rate.

In a case where the extract containing various dioxins and non-DL-PCBs is analyzed using a high resolution gas chromatograph/mass spectrometer (high resolution GC/MS), the mono-ortho PCBs influence a quantitative analysis result of the PCDDs and the PCDFs. Also, the PCDDs and the PCDFs influence a quantitative analysis result of the mono-ortho PCBs. Thus, there is a probability that the analysis result lacks reliability. However, the reliability of the analysis result can be enhanced using a gas chromatograph/triple quadrupole mass spectrometer (GC-MS/MS).

Second Embodiment

Another embodiment of an extraction column used for performing the method for extracting the organic halogen compound according to the present invention will be described with reference to FIG. 2. An extraction column 2 of the present embodiment is configured in such a manner that the adsorbent layer 100 of the first column 10 of the extraction column 1 of the first embodiment is changed and the shape of the second column 20 of the extraction column 1 is changed.

The adsorbent layer 100 used in the first column 10 of the present embodiment is for treating an impurity contained in an organic halogen compound-containing solution as in the first embodiment. A silver nitrate silica gel layer 210 and a sulfuric silica gel layer 220 are stacked in this order from above in the first column 10.

The silver nitrate silica gel layer 210 is a layer made of silver nitrate silica gel. The silver nitrate silica gel used herein is prepared in such a manner that after a silver nitrate aqueous solution has been uniformly added to a surface of silica gel (normally, active silica gel the degree of activity of which has been enhanced by heating) in a grain form with a particle size of about 40 to 210 μm, moisture is removed by heating under a reduced pressure. The amount of silver nitrate supported on silica gel is normally preferably set to 5 to 20% of the mass of the silica gel. In a case where the support amount is less than 5%, there is a probability that an impurity treatment effect is degraded in the silver nitrate silica gel layer 210. Conversely, in a case where the support amount exceeds 20%, an organic halogen compound is easily trapped because of a great silver ion amount in the silver nitrate silica gel layer 210, leading to a probability that part of the organic halogen compound is less likely to be recovered in extraction of the organic halogen compound.

The moisture content of the silver nitrate silica gel layer 210 is generally preferably set to 2 to 10% of the mass of the silica gel and more preferably 3.5 to 5%. In a case where the moisture content is 2% or less, the organic halogen compound is easily trapped because of a silver ion activity being enhanced in the silver nitrate silica gel layer 210, leading to a probability that part of the organic halogen compound is less likely to be recovered in extraction of the organic halogen compound. Conversely, in a case where the moisture content exceeds 10%, there is a probability that the impurity treatment effect is degraded in the silver nitrate silica gel layer 210.

The filling density of the silver nitrate silica gel in the silver nitrate silica gel layer 210 is not specifically limited, but is normally preferably set to 0.3 to 0.8 g/cm$^3$ and more preferably 0.4 to 0.7 g/cm$^3$. In a case where the density is less than 0.3 g/cm$^3$, there is a probability that an impurity treatment efficiency is degraded. Conversely, in a case where the density exceeds 0.8 g/cm$^3$, an aliphatic hydrocarbon solvent is less likely to pass through the adsorbent layer 100.

The sulfuric silica gel layer 220 is similar to the sulfuric silica gel layer 120 used in the first embodiment.

The second column 20 used in the present embodiment is a cylindrical member opening at both ends, and is made of a material similar to that used in the first embodiment. On the upper end side of the second column 20 as viewed in the figure, the attachment portion 21 into which the lower end portion of the first column 10 as viewed in the figure is insertable is formed. The thread portion (not shown) is formed at the inner peripheral surface of the attachment portion 21. The second column 20 further has a branched path 22 opening at a tip end below the attachment portion 21.

The second column 20 is, below the branched path 22, filled with the trapping layer 200. The trapping layer 200 is similar to that used in the first embodiment. The inner diameter of the second column 20 and the length of the portion, which can be filled with the trapping layer 200, of the second column 20 are set similarly to the second column 20 of the first embodiment.

Figure 2:
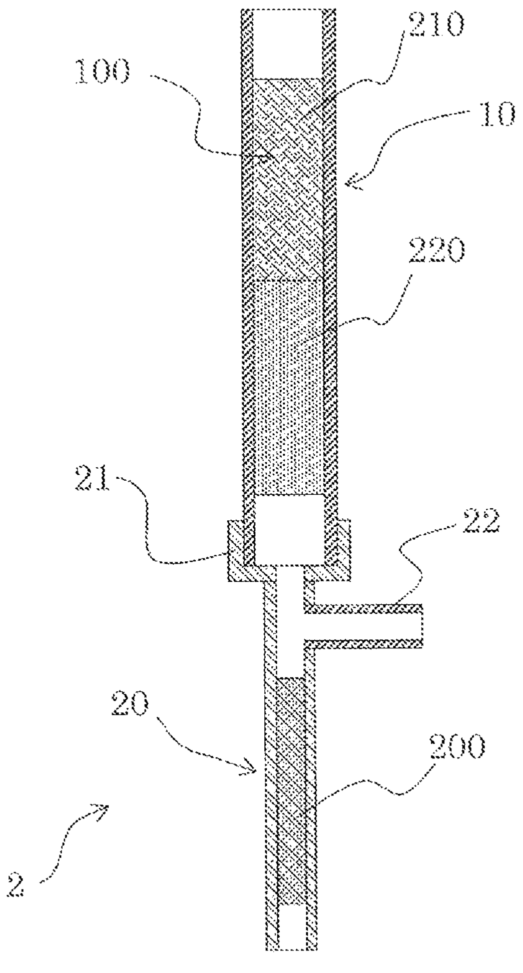
FIG. 2 is a schematic view of another embodiment of the extraction column available for the method for extracting the organic halogen compound according to the present invention.

In a case where the organic halogen compound is extracted from the organic halogen compound-containing solution by means of the extraction column 2 of the present embodiment, the extraction column 2 is installed in a standing state as shown in FIG. 2, and the tip end opening of the branched path 22 is closed. Then, the organic halogen compound-containing solution is added onto the adsorbent layer 100 in the first column 10 through the upper end opening. At this point, part of the adsorbent layer 100, i.e., the entirety of the silver nitrate silica gel layer 210 and an upper portion of the sulfuric silica gel layer 220, is preferably heated.

The added organic halogen compound-containing solution penetrates an upper portion of the silver nitrate silica gel layer 210, and is heated together with the above-described part of the adsorbent layer 100. The heating temperature of the adsorbent layer 100 is set to 35° C. or more, preferably 50° C. or more, and more preferably 60° C. or more. By such heating, part of the impurity other than the organic halogen compound in the organic halogen compound-containing solution reacts with the adsorbent layer 100, and is decomposed. In a case where the heating temperature is less than 35° C., the reaction between the impurity and the adsorbent layer 100 is less likely to progress, leading to a probability that part of the impurity easily remains in an organic halogen compound-containing extract. The upper limit of the heating temperature is not specifically limited, but considering safety, is normally preferably the boiling temperature of the organic halogen compound-containing solution or less.

Next, for a predetermined time from the start of heating, such as after a lapse of 10 to 60 minutes, the aliphatic hydrocarbon solvent similar to that in the first embodiment is supplied to the adsorbent layer 100 in the first column 10 through the upper end opening, and passes through the adsorbent layer 100. At this point, heating of the adsorbent layer 100 may be continued or stopped. The aliphatic hydrocarbon solvent supplied to the adsorbent layer 100 dissolves the organic halogen compound contained in the organic halogen compound-containing solution having penetrated the adsorbent layer 100, a decomposition product of the impurity, and the undecomposed remaining impurity, and passes through the adsorbent layer 100. At this point, part of the decomposition product and impurity adsorbs to the silver nitrate silica gel layer 210 and the sulfuric silica gel layer 220. Moreover, the aliphatic hydrocarbon solvent passing through the adsorbent layer 100 is naturally cooled while passing through an unheated portion, i.e., a lower portion of the sulfuric silica gel layer 220.

The aliphatic hydrocarbon solvent having passed through the adsorbent layer 100 flows into the second column 20 from the first column 10, and passes through the trapping layer 200. Then, the aliphatic hydrocarbon solvent flows out of the lower end opening of the second column 20, and is discarded. At this point, the organic halogen compound contained in the aliphatic hydrocarbon solvent from the adsorbent layer 100 is trapped in the trapping layer 200, and is separated from the aliphatic hydrocarbon solvent.

After the aliphatic hydrocarbon solvent has passed through the trapping layer 200, the upper end opening of the first column 10 is closed in an air-tight manner, and the end portion of the branched path 22 is opened. Then, after, e.g., inert gas has been supplied, as in the case of the first embodiment, to the second column 20 through the lower end opening to discharge the aliphatic hydrocarbon solvent from the branched path 22 and the trapping layer 200 has been dried accordingly, a solvent for extracting the organic halogen compound is supplied to the second column 20 through the lower end opening and passes through the trapping layer 200. The extraction solvent used herein is similar to that in the first embodiment. The extraction solvent supplied to the trapping layer 200 flows to the branched path 22 while extracting the organic halogen compound trapped in the trapping layer 200, and is discharged from the branched path 22. When the extraction solvent discharged from the branched path 22 as described above, i.e., the extraction solvent having passed through the trapping layer 200, is obtained, the organic halogen compound-containing extract is obtained.

Third Embodiment

Figure 3:
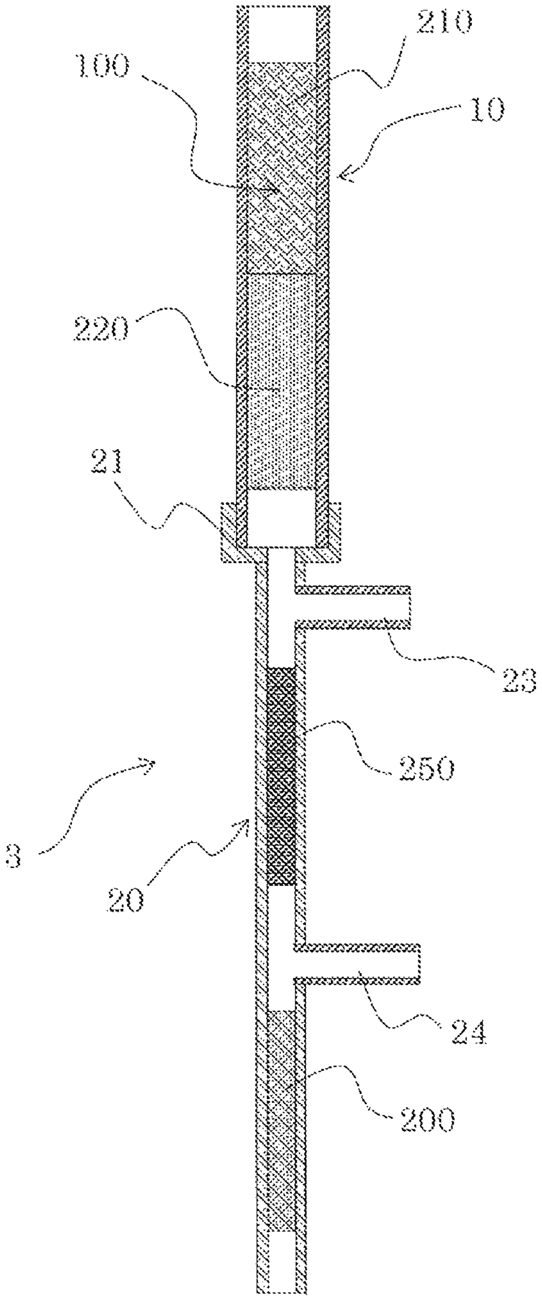
FIG. 3 is a schematic view of still another embodiment of the extraction column available for the method for extracting the organic halogen compound according to the present invention.

Still another embodiment of an extraction column used for performing the method for extracting the organic halogen compound according to the present invention will be described with reference to FIG. 3. An extraction column 3 of the present embodiment is configured in such a manner that the second column 20 of the extraction column 2 of the second embodiment is changed. The extraction column 3 is suitable for use when an organic halogen compound-containing solution contains many types of organic halogen compounds and these organic halogen compounds are extracted while being separated. For example, there is a case where the organic halogen compounds contained in the organic halogen compound-containing solution are dioxins and non-DL-PCBs. In this case, when these organic halogen compounds are collectively extracted using the extraction column 1 of the first embodiment or the extraction column 2 of the second embodiment and an extract containing these components is analyzed using a high resolution GC/MS, mono-ortho PCBs influence a quantitative analysis result of PCDDs and PCDFs, and the PCDDs and the PCDFs influence a quantitative analysis result of the mono-ortho PCBs, as described in the first embodiment. For this reason, in a case where the organic halogen compounds are extracted from the solution containing the dioxins and the non-DL-PCBs and the extract containing these components is analyzed using the high resolution GC/MS, it is advantageous in enhancing analysis accuracy to separately obtain an extract containing the mono-ortho PCBs and an extract containing the PCDDs and the PCDFs.

The second column 20 used in this embodiment is basically a cylindrical member opening at both ends, is made of a material similar to that used in the second embodiment, and is set longer than the second column 20 of the second embodiment. On the upper end side of the second column 20 as viewed in the figure, the attachment portion 21 into which the lower end portion of the first column 10 as viewed in the figure is insertable is formed. The thread portion (not shown) is formed at the inner peripheral surface of the attachment portion 21. The second column 20 has two branched paths opening at tip ends below the attachment portion 21, i.e., a first branched path 23 and a second branched path 24 spaced from each other.

The second column 20 is filled with the trapping layer 200 below the second branched path 24, and a portion between the first branched path 23 and the second branched path 24 is filled with a precedent trapping layer 250. The trapping layer 200 is a layer similar to the trapping layer 200 of the second embodiment. The precedent trapping layer 250 is made of a carbon-based material or active magnesium silicate. The carbon-based material to be used may include, for example, activated carbon or graphite in a grain form, and carbon material-containing silica gel such as activated carbon-containing silica gel or graphite-containing silica gel described in WO 2014/192055 A. The activity of active magnesium silicate is enhanced in such a manner that moisture is removed by heating of magnesium silicate, and such active magnesium silicate is described in JP-A-2020-115111. The carbon-based material to be used may also include a mixture of active magnesium silicate and graphite as described in JP-A-2020-115111.

The second column 20 is preferably set such that the inner diameter thereof is 3 to 10 mm and the length of the portion, which can be filled with the trapping layer 200, of the second column 20 is about 20 to 50 mm. The length of a portion, which can be filled with the precedent trapping layer 250, of the second column 20 is preferably set to about 20 to 50 mm.

Next, a method for extracting the organic halogen compounds from the organic halogen compound-containing solution by means of the extraction column 3 will be described. In this extraction method, after the organic halogen compound-containing solution has been added to the adsorbent layer 100 and has been heated in a manner similar to the method for extracting the organic halogen compound by means of the extraction column 2 of the second embodiment, an aliphatic hydrocarbon solvent is supplied to the adsorbent layer 100, and passes through the adsorbent layer 100. Then, the aliphatic hydrocarbon solvent flowing from the first column 10 to the second column 20 after having passed through the adsorbent layer 100 passes through the precedent trapping layer 250 and the trapping layer 200 in this order, and flows out of the second column 20 through the lower end opening and is discarded. At this point, an impurity contained in the organic halogen compound-containing solution is mainly treated in the adsorbent layer 100 as in the case of the second embodiment. Part of the impurity remaining in the aliphatic hydrocarbon solvent having passed through the adsorbent layer 100 passes through the precedent trapping layer 250 and the trapping layer 200 together with the aliphatic hydrocarbon solvent and is discarded. The remaining impurity is trapped in the precedent trapping layer 250 and the trapping layer 200. Meanwhile, the organic halogen compounds contained in the aliphatic hydrocarbon solvent from the adsorbent layer 100 are trapped in the precedent trapping layer 250 and the trapping layer 200, and are separated from the aliphatic hydrocarbon solvent. Note that the aliphatic hydrocarbon solvent used herein is similar to that in the first embodiment.

In a case where the organic halogen compound-containing solution is the solution containing the dioxins and the non-DL-PCBs, the non-ortho PCBs, PCDDs, and PCDFs of the dioxins are trapped in the precedent trapping layer 250, and the mono-ortho PCBs and non-DL-PCBs of the dioxins are trapped in the trapping layer 200. That is, the dioxins and non-DL-PCBs contained in the organic halogen compound-containing solution are, in the second column 20, fractionated into a dioxin group including the non-ortho PCBs, PCDDs, and PCDFs trapped in the precedent trapping layer 250 and a PCB group including the mono-ortho PCBs and non-DL-PCBs trapped in the trapping layer 200.

After the aliphatic hydrocarbon solvent has passed through the trapping layer 200, the upper end opening of the first column 10 and the opening of the second branched path 24 are closed in an air-tight manner. Then, e.g., inert gas is supplied, as in the case of the first embodiment, to the second column 20 through the lower end opening to discharge the aliphatic hydrocarbon solvent from the first branched path 23, and the trapping layer 200 and the precedent trapping layer 250 are dried accordingly. Thereafter, the upper end opening of the first column 10 and the opening of the first branched path 23 are closed in an air-tight manner, and the opening of the second branched path 24 is opened. A solvent for extracting the organic halogen compounds is supplied to the second column 20 through the lower end opening, and passes through the trapping layer 200. The extraction solvent used herein is similar to that in the first embodiment.

The extraction solvent supplied to the trapping layer 200 flows to the second branched path 24 while extracting the organic halogen compounds trapped in the trapping layer 200, and is discharged from the second branched path 24. When the extraction solvent discharged from the second branched path 24 as described above is obtained, an extract containing the organic halogen compounds trapped in the trapping layer 200, i.e., a PCB group-containing extract, is obtained. The trapping layer 200 can trap various homologues of polychlorinated biphenyls with a chlorine number of 1 to 10. Therefore, a failure to recover each homologue of polychlorinated biphenyls can be reduced for the PCB group-containing extract obtained in this step.

Next, the upper end opening of the first column 10 and the opening of the second branched path 24 are closed in an air-tight manner, and the opening of the first branched path 23 is opened. A solvent for extracting the organic halogen compounds is supplied to the second column 20 through the lower end opening, and passes through the trapping layer 200 and the precedent trapping layer 250 in this order. The extraction solvent used herein can be selected from those similar to the solvents described in the first embodiment, and may be the same as or different from that used for extraction from the trapping layer 200.

The extraction solvent supplied to the precedent trapping layer 250 through the trapping layer 200 flows to the first branched path 23 while extracting the organic halogen compounds trapped in the precedent trapping layer 250, and is discharged from the first branched path 23. When the extraction solvent discharged from the first branched path 23 as described above is obtained, an extract containing the organic halogen compounds trapped in the precedent trapping layer 250, i.e., an extract containing the aforementioned dioxin group, is obtained.

In this embodiment, the extract containing the aforementioned dioxin group and the PCB group-containing extract can be separately obtained. Therefore, each extract is analyzed using the high resolution GC/MS so that each component contained in the aforementioned dioxin group and each component contained in the PCB group can be analyzed with a high accuracy.

Fourth Embodiment

The second column 20 used in the extraction column 1 of the first embodiment uses the trapping material containing zirconium oxide in a powder grain form with an excellent capacity of selectively trapping the organic halogen compound. Therefore, the second column 20 itself separated from the first column 10 can be used for purifying the organic halogen compound contained in the organic halogen compound-containing solution or transferring the organic halogen compound to other solvents. In this case, the organic halogen compound-containing solution is added to the trapping layer 200 of the second column 20. The organic halogen compound contained in the added organic halogen compound-containing solution is trapped in the trapping layer 200 while the solvent of this solution passes through the trapping layer 200. If the organic halogen compound-containing solution contains the impurity, specifically a hydrocarbon compound-based impurity, together with the organic halogen compound, such an impurity is not trapped in the trapping layer 200, passes through the trapping layer 200 together with the solvent, and is separated from the organic halogen compound. The trapping layer 200 after the organic halogen compound-containing solution has been added may be dried as necessary by supply of inert gas of, e.g., nitrogen or heating. Subsequently, after the extraction solvent has been supplied to and passed through the trapping layer 200, the organic halogen compound trapped in the trapping layer 200 is extracted by the extraction solvent. Thus, when the extraction solvent having passed through the trapping layer 200 is obtained, the extraction solvent solution containing the extracted organic halogen compound is obtained. If the organic halogen compound-containing solution added to the trapping layer 200 contains the impurity, the obtained extraction solvent solution is a purified solution from which the impurity has been removed. If one different from the solvent of the organic halogen compound-containing solution is used as the extraction solvent, the obtained extraction solvent solution is one obtained after the organic halogen compound in the organic halogen compound-containing solution has been transferred to the extraction solvent.

When the extraction solvent is supplied, the extraction solvent may be supplied with the second column 20 vertically inverted as in the case of the first embodiment, or may be supplied through the opening, through which the organic halogen compound-containing solution has been added, without the second column 20 vertically inverted. Note that for the purpose of purifying the organic halogen compound-containing solution, the same extraction solvent as the solvent of the organic halogen compound-containing solution may be used.

The organic halogen compound-containing solution targeted for purification or transfer is normally an organic solvent solution using various organic solvents, but may be an aqueous solution as long as the trapping layer 200 to which such a solution has been added is dried.

Figure 4:
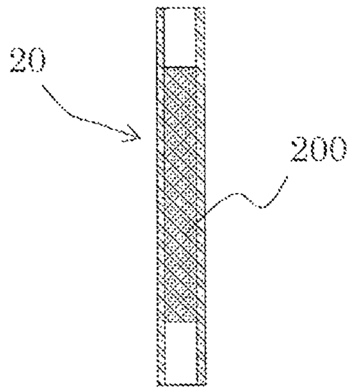
FIG. 4 is a schematic view of one form of the organic halogen compound trapping column available for the method for extracting the organic halogen compound according to the present invention.

The second column 20 used for the purpose of purification or transfer may have a simple shape without the attachment portion 21, as shown in FIG. 4.

Modifications

In each of the first to third embodiments, the adsorbent layer 100 of the first column 10 is changeable to various other forms for the purpose of treating the impurity contained in the organic halogen compound-containing solution. For example, the adsorbent layer 100 used in the second or third embodiment may be used in the first embodiment, or the adsorbent layer 100 used in the first embodiment may be used in the second or third embodiment. Alternatively, the adsorbent layer 100 of the first embodiment may be formed without the holding layer 110, or the adsorbent layer 100 of the second or third embodiment may be formed without the sulfuric silica gel layer 220. As another alternative, the adsorbent layer 100 of the second or third embodiment may be configured such that the silver nitrate silica gel layer 210 is substituted for a layer formed using mixed nitrate silica gel described in JP-A-2015-21868.

The adsorbent layer 100 of the second or third embodiment may also be configured such that the order of the silver nitrate silica gel layer 210 and the sulfuric silica gel layer 220 is switched. In this case, the impurity contained in the organic halogen compound-containing solution is decomposed mainly in the sulfuric silica gel layer 220, and part of the decomposition product and the impurity is trapped mainly in the silver nitrate silica gel layer 210. In this modification, a carrier layer with fixed permanganate may be arranged between the sulfuric silica gel layer 220 and the silver nitrate silica gel layer 210. With this carrier layer, SOx gas caused upon decomposition of the impurity in the sulfuric silica gel layer 220 can be consumed in the carrier layer. Therefore, safety in an operation of extracting the organic halogen compound from the organic halogen compound-containing solution can be enhanced.

The carrier layer used herein is a layer formed in such a manner that permanganate is fixed to a carrier in a grain form, such as aluminum oxide, silica gel (normally, active silica gel the degree of activity of which has been enhanced by heating), crystalline aluminosilicate including zeolite, or any mixture thereof. Permanganate is not specifically limited as long as permanganate is used as an oxidant, and for example, may include potassium permanganate, sodium permanganate, silver permanganate, magnesium permanganate, calcium permanganate, barium permanganate, and ammonium permanganate. A single type of permanganate may be used alone, or two or more types of permanganate may be used in combination.

The carrier layer can be prepared in such a manner that a permanganate aqueous solution is uniformly added to a surface of a carrier in a grain form and moisture is removed by heating under a reduced pressure such that a certain level of moisture content is maintained.

In the case of using the carrier layer with fixed permanganate, the carrier layer may be arranged on the lower side of the silver nitrate silica gel layer 210. In this case, part of SOx gas generated in the sulfuric silica gel layer 220 reacts with silver nitrate of the silver nitrate silica gel layer 210, and NOx gas is generated accordingly. The SOx gas generated in the silver nitrate silica gel layer 210 and the NOx gas generated in the silver nitrate silica gel layer 210 are consumed in the carrier layer with fixed permanganate.

Each figure as a reference in each of the above-described embodiments shows the outline of each component, and does not precisely reflect the structure, shape, size, ratio, or the like of each component.

EXAMPLES

Hereinafter, the present invention will be specifically described with reference to examples, but is not limited to these examples. A filler used in the following examples is as follows.

[Filler]

Sulfuric Silica Gel:

Sulfuric silica gel was used, which was prepared in such a manner that concentrated sulfuric acid (product name "Sulfuric Acid" 190-04675 manufactured by FUJIFILM Wako Pure Chemical Corporation, for precision analysis) is uniformly added to active silica gel (manufactured by KANTO CHEMICAL CO., INC.) and the resultant is dried. The amount of concentrated sulfuric acid added to the active silica gel was set such that the amount of sulfuric acid with respect to the active silica gel is 44% in terms of mass.

Silver Nitrate Silica Gel:

An aqueous solution in which silver nitrate (product name "Silver Nitrate" 198-00835 manufactured by FUJIFILM Wako Pure Chemical Corporation, special reagent grade) is dissolved in distilled water was added to and uniformly mixed with active silica gel (manufactured by KANTO CHEMICAL CO., INC.). Silver nitrate silica gel was used, which was prepared in such a manner that the resultant mixture is heated to 70° C. under a reduced pressure by means of a rotary evaporator and is dried. A silver nitrate aqueous solution the amount of silver nitrate of which with respect to the mass of the active silica gel is set to 10% was used, and the amount of silver nitrate in the silver nitrate silica gel was set to 10% of the mass of the active silica gel.

Zirconium Oxide:

Zirconium oxide powder (obtained in such a manner that a product name "Zirconium Oxide, catalyst support" manufactured by Alfa Aesar is ground and screened to a particle size of 250 μm or less) was placed in a tubular furnace, and was fired for 2.5 hours under a nitrogen flow while the temperature of the tubular furnace was controlled to 1,000° C. or less. Thereafter, heating of the tubular furnace was stopped, and the tubular furnace was cooled to a room temperature. In this manner, activated zirconium oxide in a powder form was obtained.

Example 1

The extraction column 1 according to the first embodiment was produced. Here, the first column 10 with an inner diameter of 13 mm and a length of 70 mm was filled with sulfuric silica gel of 3.3 g to a height of 35 mm. In this manner, the sulfuric silica gel layer 120 was formed. On such a layer, silica gel (product name "Silica Gel 60, spherical" manufactured by KANTO CHEMICAL CO., INC.) of 0.5 g was applied to a height of 10 mm. In this manner, the holding layer 110 was formed. As a result, the adsorbent layer 100 configured such that the holding layer 110 is stacked on the sulfuric silica gel layer 120 was formed. Moreover, the second column 20 with an inner diameter of 4.6 mm and a length of 100 mm was filled with zirconium oxide of about 0.6 g to a height of 35 mm. In this manner, the trapping layer 200 was formed. Then, the second column 20 was coupled to the lower end of the first column 10 standing with the holding layer 110 of the adsorbent layer 100 on the upper layer side, and in this manner, the extraction column 1 was produced.

A solution of 50 μL obtained in such a manner that a PCB standard substance solution (product name "BP-MS" manufactured by Wellington Laboratories Inc.) is diluted with iso-octane to a concentration of 100 ng/mL and hexane of 100 μL were mixed, and in this manner, a sample A was prepared.

The total amount of sample A was added to the adsorbent layer 100 of the extraction column 1, and n-hexane of 0.7 mL was further added thereto. Thereafter, n-hexane of 20 mL was supplied into the first column 10 from the upper end at a speed of 2 mL/min., passed through the adsorbent layer 100 and the trapping layer 200 in this order, and flowed out of the second column 20 through the lower end. Meanwhile, the temperature of the adsorbent layer 100 of the first column 10 was maintained at a room temperature (25° C.). After the end of supply of n-hexane, the first column 10 and the second column 20 were separated from each other, and air was supplied to the vertically-inverted second column 20 in a direction opposite to an n-hexane passing direction. In this manner, n-hexane remaining in the second column 20 was removed. At this point, the second column 20 was heated, and the temperature thereof was maintained at 85° C.

Next, toluene of 1.2 mL was supplied to the second column 20 maintained in the vertically-inverted state in the direction opposite to the n-hexane passing direction, and PCBs trapped in the trapping layer 200 were extracted. At this point, the second column 20 was heated, and the temperature of the trapping layer 200 was maintained at 85° C. A toluene solution of about 1 mL from the second column 20 was collected as a PCBs-containing extract. A time required until this extract was obtained after addition of the sample A and n-hexane was approximately 0.7 hours.

Figure 5:
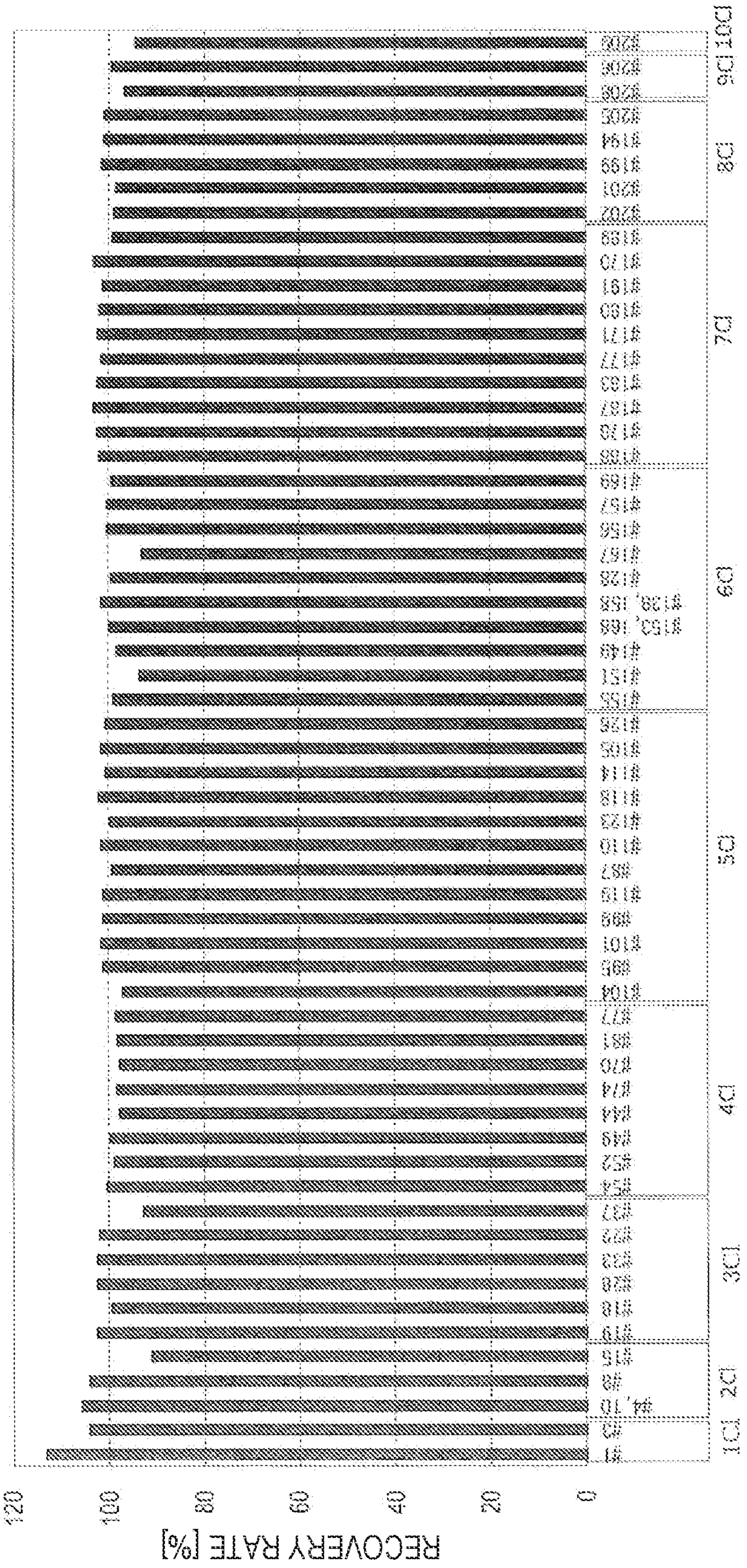
FIG. 5 is a graph showing results of Example 1.

For the obtained extract, the rate of recovery of each homologue of the PCBs was calculated. Here, an analysis sample was prepared in such a manner that a solution of 100 μL obtained by diluting of a PCB internal standard substance solution (product name "MBP-MXP" manufactured by Wellington Laboratories Inc.) for recovery rate calculation with iso-octane to a concentration of 20 ng/mL is added to an extract condensed to 350 μL. This analysis sample was analyzed by an HRGC/LRMS method with reference to a method described in "Provisional Surveillance Manual for Endocrine Disruptors" provided from the Environmental Agency in October 1998, and in this manner, the rate of recovery of each homologue of the PCBs was calculated. Results are shown in FIG. 5. In FIG. 5, the horizontal axis shows the chlorine numbers of the PCBs from 1Cl to 10Cl, and an indication such as #1 is an IUPAC number provided to each homologue of the PCBs.

According to FIG. 5, the rate of recovery of each homologue of the PCBs with a chlorine number of 1 to 10 is high, and a failure to recover the homologues of the PCBs in the course of extraction is less likely to be caused.

Example 2

The extraction column 2 according to the second embodiment was produced. Here, the first column 10 with an inner diameter of 12.5 mm and a length of 200 mm was filled with sulfuric silica gel of 8.5 g to a height of 80 mm. In this manner, the sulfuric silica gel layer 220 was formed. On such a layer, silver nitrate silica gel of 4.4 g was applied to a height of 60 mm. In this manner, the silver nitrate silica gel layer 210 was formed. In this manner, the adsorbent layer 100 configured such that the silver nitrate silica gel layer 210 is stacked on the sulfuric silica gel layer 220 was formed. Moreover, the second column 20 with an inner diameter of 6 mm and a length of 50 mm was filled with zirconium oxide of 0.75 g to a height of 28 mm. In this manner, the trapping layer 200 was formed. The second column 20 was coupled to the lower end of the first column 10 standing with the silver nitrate silica gel layer 210 of the adsorbent layer 100 on the upper layer side, and in this manner, the extraction column 2 was produced.

A solution of 10 μL obtained in such a manner that a PCB standard substance solution (product name "BP-MS" manufactured by Wellington Laboratories Inc.) is diluted with decane to a concentration of 20 ng/mL and an n-hexane solution containing toluene of 0.2% were mixed, and in this manner, a sample B of 1 mL was prepared.

The adsorbent layer 100 of the extraction column 2 was added and moistened with n-hexane of 1 mL, and thereafter, the total amount of sample B was added to the adsorbent layer 100. Next, n-hexane of 1 mL was further added to the adsorbent layer 100 three times, and thereafter, the entirety of the silver nitrate silica gel layer 210 of the adsorbent layer 100 and the upper half of the sulfuric silica gel layer 220 were heated to 60° C. Then, n-hexane of 85 mL was gradually supplied to the adsorbent layer 100, and passed through the adsorbent layer 100 and the trapping layer 200 in this order. After passage of n-hexane through the trapping layer 200, compressed air passed from the lower end opening of the second column 20 to the branched path 22, and the trapping layer 200 was dried accordingly. Then, the trapping layer 200 was heated to 90° C., and thereafter, the upper opening of the first column 10 is closed in an air-tight manner and toluene of 2.5 mL was supplied to the trapping layer 200 through the lower opening of the second column 20. The total amount of toluene having passed through the trapping layer 200 was collected as an extract through the branched path 22. A time required until the extract was obtained after addition of the sample B was about 1.5 hours.

Figure 6:
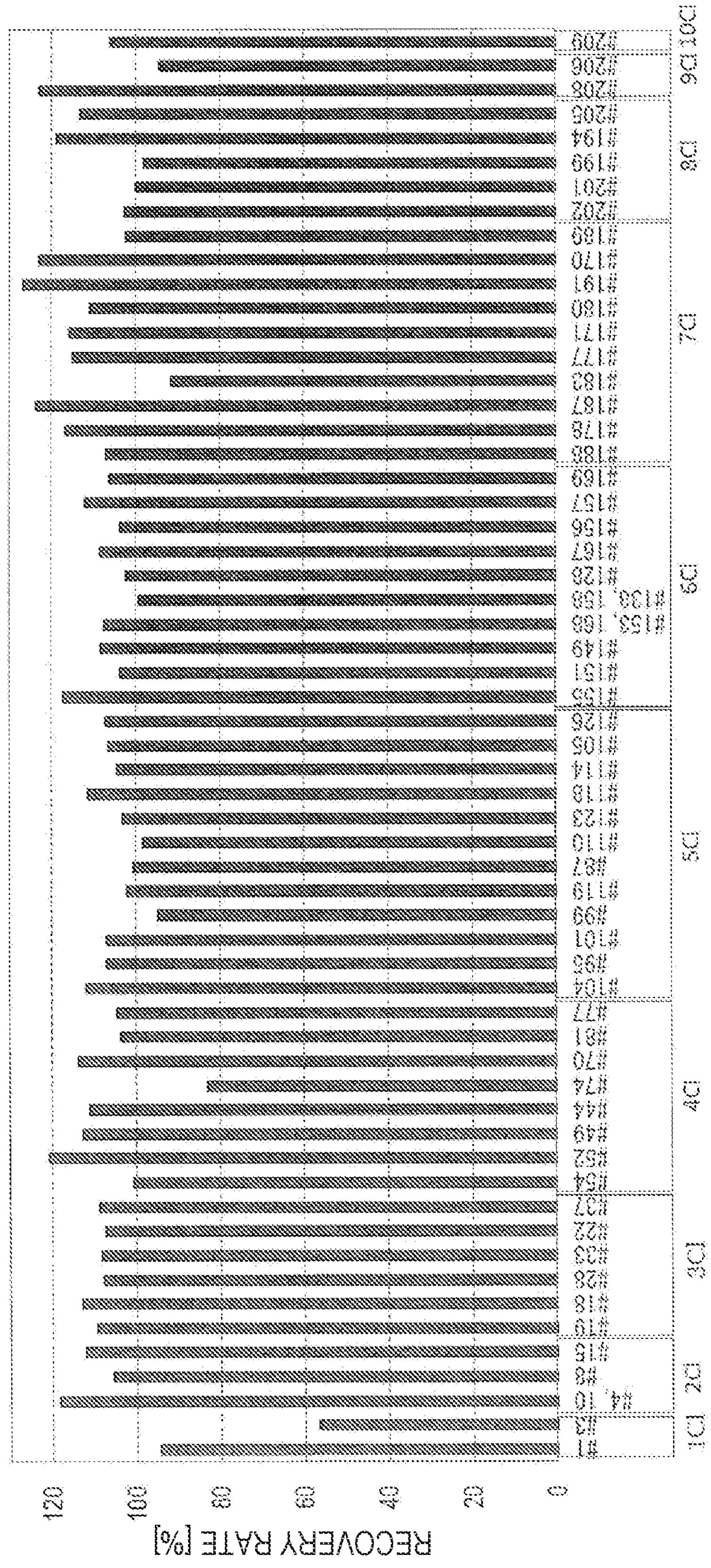
FIG. 6 is a graph showing results of Example 2.

For the obtained extract, the rate of recovery of each homologue of PCBs was calculated. Here, an analysis sample was prepared in such a manner that a solution of 20 μL obtained by diluting of a PCB internal standard substance (product name "PCB-LCS-H" manufactured by Wellington Laboratories Inc.) for recovery rate calculation with decane to a concentration of 10 ng/mL is added to an extract condensed to 20 μL and decane is further added thereto. The volume of the analysis sample was fixed to 50 μL. This analysis sample was quantitatively analyzed by the HRGC/HRMS method, and in this manner, the rate of recovery of each homologue of the PCBs was calculated. Results are shown in FIG. 6. In FIG. 6, indications from 1Cl to 10Cl of the horizontal axis and an indication such as #1 are the same as those in FIG. 5.

According to FIG. 6, the rate of recovery of each homologue of the PCBs with a chlorine number of 1 to 10 is substantially high, and a failure to recover the homologues of the PCBs in the course of extraction is less likely to be caused.

Example 3

A solution of 50 μL obtained in such a manner that a PBDE standard substance solution (product name "MASS-LABELLED PBDE CONGENERS" manufactured by Wellington Laboratories Inc.) is diluted 50 times with iso-octane and a hexane of 100 μL were mixed, and in this manner, a sample C was prepared. Using the total amount of sample C, extraction operation was performed similarly to Example 1.

For the obtained extract, the rate of recovery of each homologue of PBDEs was calculated. Here, the extract was condensed to about 50 μL, and thereafter, a solution of 50 μL obtained in such a manner that a PBDE internal standard substance solution (product name "BFR-ISS" manufactured by Wellington Laboratories Inc.) for recovery rate calculation is diluted 50 times with iso-octane was added thereto. This solution was further condensed to 50 μL, and in this manner, an analysis sample was prepared. This analysis sample was analyzed by the HRGC/HRMS method, and in this manner, the rate of recovery of each homologue of the PBDEs was calculated. Results are shown in Table 1.

TABLE 1

| PBDEs (IUPAC Number) | Recovery Rate (%) |
|---|---|
| $^{13}$C-M1BDEs (#3) | 8 |
| $^{13}$C-D2BDEs (#15) | 83 |
| $^{13}$C-T3BDEs (#28) | 87 |
| $^{13}$C-T4BDEs (#47) | 90 |
| $^{13}$C-P5BDES (#99) | 80 |
| $^{13}$C-H6BDEs (#153, 154) | 85 |
| $^{13}$C-H7BDES (#183) | 83 |
| $^{13}$C-O8BDEs (#197) | 82 |
| $^{13}$C-N9BDES (#207) | 86 |
| $^{13}$C-D10BDEs (#209) | 90 |

According to Table 1, the rate of recovery of each homologue of the PBDEs is substantially high, except for some homologues. It shows that a failure to recover the PBDEs in the course of extraction is less likely to be caused.

Example 4

The second column 20 according to the fourth embodiment shown in FIG. 4 was produced. Using n-hexane, a glass column with an inner diameter of 14.6 mm and a length of 20 cm was wet-filled with zirconium oxide of 1 g, and the trapping layer 200 formed in this manner was fixed with a fritz. In this manner, the second column 20 was produced.

A decane solution of 50 μL containing, in a concentration of 0.1 mg/L, each of oxychlordane, cis-chlordane, trans-chlordane, cis-nonachlor, and trans-nonachlor as chlordanes and n-hexane of 100 μL were mixed, and in this manner, a sample D was prepared. The total amount of sample D was added to the standing second column 20 from the upper opening, and thereafter, n-hexane of 2 mL was added thereto. Further, n-hexane of 20 mL was gradually added to and passed through the second column 20. After passage of n-hexane, a 25% diethyl ether-containing n-hexane solution of 40 mL was supplied to the second column 20 from the lower opening, and passed therethrough. An extract was obtained from the upper opening of the second column 20.

For the obtained extract, the rate of recovery of each chlordane was calculated. Here, a chlordane $^{13}$C internal standard substance solution (product name "EXPANDED POPS PESTICIDES CLEANUP SPIKE" manufactured by Cambridge Isotope Laboratories, Inc.) for recovery rate calculation was added to the extract, and the resultant was condensed to 20 μL. In this manner, an analysis sample was prepared. This analysis sample was analyzed by the HRGC/HRMS method, and in this manner, the rate of recovery of each chlordane was calculated. Results are shown in Table 2.

TABLE 2

| Chlordanes | Recovery Rate (%) |
|---|---|
| Oxychlordane | 89 |
| Cis-chlordane | 89 |
| Trans-chlordane | 96 |

TABLE 2-continued

| Chlordanes | Recovery Rate (%) |
|---|---|
| Cis-nonachlor | 99 |
| Trans-nonachlor | 90 |

According to Table 2, the rate of recovery of each chlordane is high, and it shows that a failure to recover the chlordanes in the course of extraction is less likely to be caused.

LIST OF REFERENCE NUMERALS

1, 2, 3 Extraction Column
10 First Column
20 Second Column
100 Adsorbent Layer
200 Trapping Layer

The invention claimed is:

1. A column for extracting an organic halogen compound from a solution containing the organic halogen compound and an impurity, the column comprising:

a first column filled with an adsorbent layer capable of treating the impurity; and a second column having a first end and a second end; provided with a first branched path and a second branched path in this order at a distance apart in the direction from the first end toward the second end, and filled with a trapping layer capable of trapping the organic halogen compound in a portion between the second branched path and the second end, wherein, the adsorbent layer comprises a silver nitrate silica gel layer and a sulfuric silica gel layer, the trapping layer contains zirconium oxide in a powder grain form, the second column is further filled with a precedent trapping layer made of a carbon-based material or active magnesium silicate in a portion between the first branched path and the second branched path, and the second column is coupled to the first column at the first end in a liquid-tight and detachable manner.

2. A column for extracting an organic halogen compound from a solution containing the organic halogen compound and an impurity according to claim 1, wherein the silver nitrate silica gel layer and the sulfuric silica gel layer are laminated in this order toward an end of the first column to which the second column is coupled.

3. A column for extracting an organic halogen compound from a solution containing the organic halogen compound and an impurity according to claim 1, wherein the sulfuric silica gel layer and the silver nitrate silica gel layer are laminated in this order toward an end of the first column to which the second column is coupled.

4. A column for extracting an organic halogen compound from a solution containing the organic halogen compound and an impurity according to claim 1, wherein the solution contains an organic halogen compound extracted using a solvent from a material layer on a bottom in a hydrosphere or a land surface, food, a biological sample, environmental water, drainage water, electric insulating oil, incinerated ash, or a collector having collected a substance contained in gas.

* * * * *